United States Patent
Gopalakrishnan et al.

(10) Patent No.: US 12,014,188 B2
(45) Date of Patent: Jun. 18, 2024

(54) SYSTEMS AND METHODS FOR PREPROCESSING APPLICATION FUNCTIONS FOR FASTER STARTUP

(71) Applicant: Netflix, Inc., Los Gatos, CA (US)

(72) Inventors: Shyamsundar Gopalakrishnan, San Jose, CA (US); Amritanshu Thakur, San Jose, CA (US); Ashish Gupta, Santa Clara, CA (US); Sailesh Nepal, Fremont, CA (US)

(73) Assignee: Netflix, Inc., Los Gatos, CA (US)

( * ) Notice: Subject to any disclaimer, the term of this patent is extended or adjusted under 35 U.S.C. 154(b) by 689 days.

(21) Appl. No.: 17/145,023

(22) Filed: Jan. 8, 2021

(65) Prior Publication Data

US 2022/0222082 A1    Jul. 14, 2022

(51) Int. Cl.
G06F 9/46       (2006.01)
G06F 9/445      (2018.01)
G06N 20/00      (2019.01)

(52) U.S. Cl.
CPC .......... *G06F 9/445* (2013.01); *G06N 20/00* (2019.01)

(58) Field of Classification Search
CPC .............................. G06F 9/445; G06N 20/00
See application file for complete search history.

(56) References Cited

U.S. PATENT DOCUMENTS

| | | |
|---|---|---|
| 2014/0280485 A1 | 9/2014 | A Hummaida et al. |
| 2017/0097741 A1* | 4/2017 | Liang ................. G06F 16/9574 |
| 2020/0306632 A1 | 10/2020 | Kolen et al. |

OTHER PUBLICATIONS

"Android fundamentals 08.3: JobScheduler", URL: https://developer.android.com/codelabs/android-training-job-scheduler, Nov. 5, 2020, 2 pages.
International Search Report and Written Opinion received for PCT Application Serial No. PCT/US2022/011636 dated Apr. 21, 2022, 12 pages.
Communication pursuant to Rules 161(1) and 162 EPC received for EP application 22702082.3 mailed on Aug. 16, 2023.
International Preliminary Report on Patentability received for PCT Application Serial No. PCT/US2022/011636 dated Jul. 4, 2023. 3 pages.
Communication pursuant to Rules 161(1) and 162 EPC for EP Application No. 22702082.3 dated Aug. 16, 2023, 3 pages.

* cited by examiner

*Primary Examiner* — Gregory A Kessler
(74) *Attorney, Agent, or Firm* — Greenberg Traurig, LLP

(57) ABSTRACT

The disclosed computer-implemented method may include predicting, by a machine learning model, a user action and a timing of the user action for an application on a computing device. The method may also include determining that an expected lag in executing the user action is greater than a predetermined threshold based on one or more resource constraints of the computing device and initializing a setup of the application to reduce the expected lag in executing the user action based on the predicted timing. Furthermore, the method may include prefetching one or more application components in response to initializing the setup of the application and preprocessing at least a portion of a function of the application used to execute the user action. Finally, the method may include executing the user action for the application in response to a user request. Various other methods, systems, and computer-readable media are also disclosed.

20 Claims, 12 Drawing Sheets

SYSTEMS AND METHODS FOR PREPROCESSING APPLICATION FUNCTIONS FOR FASTER STARTUP

BACKGROUND

Software applications can run on computing devices and use device resources to provide additional functionality to users. Traditionally, when a user opens an application to perform some function, the application may reserve computing resources and then use those resources while performing the function. However, applications that start "cold" often have higher latency between the user attempting to perform an action and the actual execution of the action. Additionally, some functions may take especially long to prepare, based on the required resources and application logic to execute the functions.

To prepare for a "warm" start, some applications may maintain a small processing footprint on the device in order to start faster when the user launches the application. Unfortunately, applications that continually run in the background, particularly on low-end mobile devices, may use up valuable limited resources. Furthermore, applications that are less frequently used may be subject to operating system processes that kill background applications to free up resources. Other traditional methods of reducing latency may focus on faster data retrieval or streamlining application functions, such as by creating lite versions of an application. However, these methods also assume startup processes are sunk costs and accept a degree of delay based on the limitations of a device.

SUMMARY

As will be described in greater detail below, the present disclosure describes systems and methods for predicting user actions to perform "warming" processes for an application prior to application startup or execution of the predicted actions. In one example, a computer-implemented method for preprocessing application functions for faster startup may include predicting, by a machine learning model, a user action and a timing of performing the user action for an application on a computing device. The method may also include determining that an expected lag in executing the user action is greater than a predetermined threshold based on one or more resource constraints of the computing device. In addition, the method may include initializing a setup of the application to reduce the expected lag in executing the user action based on the predicted timing. Furthermore, the method may include prefetching one or more application components in response to initializing the setup of the application. Additionally, the method may include preprocessing at least a portion of a function of the application used to execute the user action. Finally, the method may include executing the user action for the application in response to a user request.

In one embodiment, predicting the user action and the timing of the user action may include training the machine learning model using a historical record of user actions on the computing device and predicting a likelihood of the user request to execute the user action based on the historical record. In this embodiment, the historical record may include data about historical use of the application on the computing device, historical use of a different application on the computing device, a state of the computing device, a state of a resource of the computing device, and/or a timing of a previous user action on the computing device. For example, the computing device may train the machine learning model using the historical record to predict the user action and the timing of the user action. Alternatively, a server may train the machine learning model and provide the predictions and/or functions and the timing of functions to perform prior to the user action to a client computing device. In another example, the server may provide the trained machine learning model to the client computing device, which may further adjust the machine learning model to predict the user action and the timing for performing the user action.

In one example, a resource constraint may include a limited resource of the computing device used by a core function to run the application and/or the function of the application used to execute the user action. In this example, the limited resource may include a processor of the computing device, a memory of the computing device, and/or an application resource stored on the computing device. Furthermore, in this example, determining that the expected lag is greater than the predetermined threshold may include calculating that a time to perform the core function using the limited resource exceeds the predetermined threshold and/or calculating that a time to perform the function used to execute the user action using the limited resource exceeds the predetermined threshold. Additionally or alternatively, determining that the expected lag is greater than the predetermined threshold may include determining that the core function contributes to the expected lag, determining that the function used to execute the user action contributes to the expected lag, and calculating that a combined time to perform the core function and the function used to execute the user action exceeds the predetermined threshold. Furthermore, in this example, initializing the setup of the application may include initializing the core function, initializing the function used to execute the user action, and/or initializing the limited resource used by the function.

In some embodiments, initializing the setup of the application to reduce the expected lag may include timing the initialization to begin prior to the predicted timing of the user action such that the reduced expected lag does not exceed the predetermined threshold.

In some examples, an application component may include metadata, an application asset, and/or a media resource. In these examples, preprocessing the function used to execute the user action may include preprocessing the metadata, loading the application asset, pre-rendering an application graphic, pre-decrypting the media resource, pre-decoding the media resource, scheduling the function used to execute the user action, and/or initializing an application startup. Additionally, pre-decoding the media resource may include preparing the media resource for playback in response to the user request.

In one embodiment, executing the user action in response to the user request may include receiving the user request and completing the setup of the application. Additionally, executing the user action may include completing the function used to execute the user action.

In some embodiments, the above method may further include reducing a likelihood of forcible termination of the application by decreasing a resource usage of the application and/or initializing the setup of the application closer to the predicted timing.

In addition, a corresponding system for preprocessing application functions for faster startup may include several modules stored in memory, including a prediction module that predicts, by a machine learning model, a user action and a timing of the user action for an application on a client computing device. The system may also include a determination module that determines that an expected lag in executing the user action is greater than a predetermined threshold based on one or more resource constraints of the client computing device. In addition, the system may include an initialization module that initializes a setup of the application to reduce the expected lag in executing the user action based on the predicted timing. Furthermore, the system may include a prefetching module that prefetches one or more application components in response to initializing the setup of the application. Additionally, the system may include a preprocessing module that preprocesses at least a portion of a function of the application used to execute the user action. The system may also include an execution module that executes the user action for the application in response to a user request. Finally, the system may include one or more processors that execute the prediction module, the determination module, the initialization module, the prefetching module, the preprocessing module, and the execution module.

In one embodiment, the prediction module may predict the user action and the timing of the user action by training the machine learning model using a historical record of user actions on a set of client computing devices, including the client computing device, and predicting a likelihood of the user request to execute the user action. In this embodiment, the historical record may include data about historical use of the client computing device by a user, historical use of another client computing device by the user, historical use of the application by another user, a state of the client computing device, a state of the other client computing device, a state of a resource of the client computing device, a state of a resource of the other client computing device, and/or a timing of a previous user action. Furthermore, in this embodiment, training the machine learning model may include training the machine learning model on a server and providing a result of the machine learning model to the client computing device. Additionally or alternatively, training the machine learning model may include training the machine learning model on a server, providing the machine learning model to the client computing device, and adjusting the machine learning model based on a historical record of the client computing device.

In some examples, the above-described method may be encoded as computer-readable instructions on a computer-readable medium. For example, a computer-readable medium may include one or more computer-executable instructions that, when executed by at least one processor of a computing device, may cause the computing device to predict, by a machine learning model, a user action and a timing of the user action for an application on the computing device. The instructions may also cause the computing device to determine that an expected lag in executing the user action is greater than a predetermined threshold based on one or more resource constraints of the computing device. In addition, the instructions may cause the computing device to initialize a setup of the application to reduce the expected lag in executing the user action based on the predicted timing. Furthermore, the instructions may cause the computing device to prefetch one or more application components in response to initializing the setup of the application. Additionally, the instructions may cause the computing device to preprocess at least a portion of a function of the application used to execute the user action. Finally, the instructions may cause the computing device to execute the user action for the application in response to a user request.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
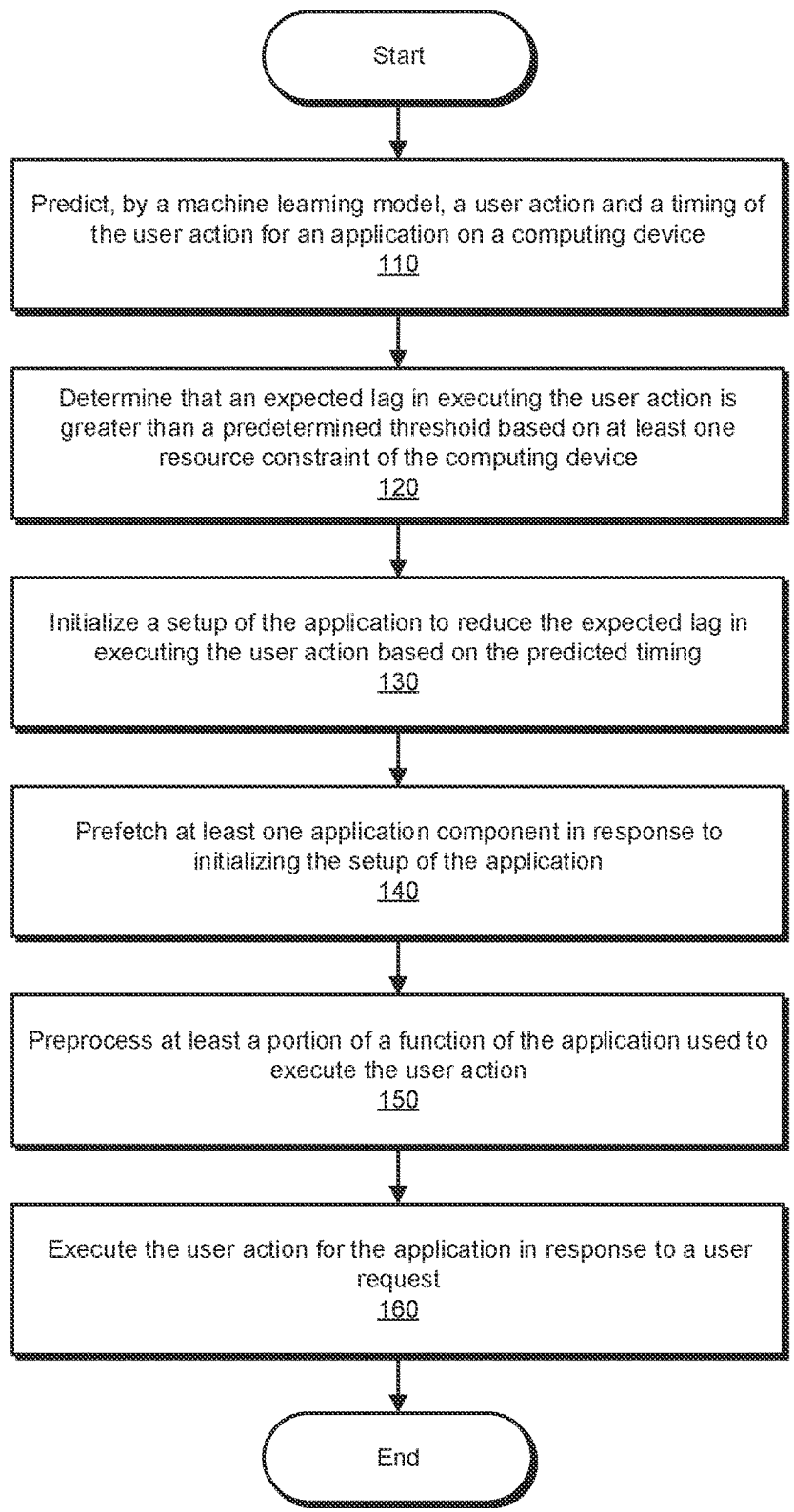
FIG. 1 is a flow diagram of an exemplary method for preprocessing application functions for faster startup.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to preprocessing application functions for faster startup. As will be explained in greater detail below, embodiments of the present disclosure may, by predicting user requests using machine learning techniques and pattern analysis, anticipate the timing to perform relevant preprocessing functions for an application just prior to a user request to perform an action. The disclosed systems and methods may first train a machine learning model to determine when a user is likely to perform an action using the application. For example, the disclosed systems and methods may track historical use of the application and identify common user behaviors or likely timing for certain functions. In some examples, the disclosed systems and methods may perform machine learning functions on a server and provide the trained model to low-end client devices that may not have the capacity to perform the machine learning function. The server may even use the trained model to predict an action and timing and may then provide the predicted action and timing directly to a client device. In other examples, the client devices may perform the machine learning functions or may additionally tailor the model to each specific device or user. By predicting the timing of when the user will execute a function, the systems and methods described herein may determine when to start preprocessing the function to perform just-in-time warming of the application. The disclosed systems and methods may then initialize the setup of the application to decrease expected delays. For example, the systems and methods described herein may prefetch relevant data and preprocess core functions needed to perform an action prior to when the user is expected to request the action.

Furthermore, the disclosed systems and methods may then execute the user action immediately after the user requests it to give an impression of near-instant loading of the application or the perception of instantaneous response to the user within the application. In some examples, rather than simply prefetching data or performing network requests, the disclosed systems and methods may prepare application-specific functions using existing data on the device to avoid using unnecessary resources. For example, by pre-decrypting and pre-rendering the first few frames of a video, the disclosed systems and methods may give the appearance of immediate video streaming upon user request while the remainder of the video is downloaded and processed.

The systems and methods described herein may improve the functioning of a computing device by reducing latency in performing application functions through predicting and preprocessing the functions prior to a user's need for the functions. In addition, these systems and methods may also improve the fields of resource management and application startup by more efficiently managing resource utilization for just-in-time preprocessing, especially for low-end devices and/or process-heavy applications. Thus, the disclosed systems and methods may improve over traditional methods of preprocessing application functions for faster application startup and for decreased user action latency.

Thereafter, the description will provide, with reference to FIG. 1, detailed descriptions of computer-implemented methods for preprocessing application functions for faster startup. Detailed descriptions of a corresponding exemplary computing device will be provided in connection with FIG. 2. Detailed descriptions of an exemplary machine learning model trained using exemplary historical data to predict an exemplary user action will be provided in connection with FIG. 3. In addition, detailed descriptions of exemplary calculations of expected lag for exemplary user actions will be provided in connection with FIGS. 4-5. Detailed descriptions of an exemplary timeline for preprocessing functions related to an exemplary user action will be provided in connection with FIG. 6. Furthermore, detailed descriptions of exemplary prefetching and preprocessing for an exemplary user action will be provided in connection with FIG. 7. Detailed descriptions of an exemplary machine learning model trained using exemplary historical records from multiple computing devices to predict an exemplary user action will be provided in connection with FIG. 8. Finally, detailed descriptions of an exemplary adjustment to an exemplary machine learning model for a specific computing device will be provided in connection with FIG. 9.

Because many of the embodiments described herein may be used with substantially any type of computing network, including distributed networks designed to provide video content to a worldwide audience, various computer network and video distribution systems will initially be described with reference to FIGS. 10-12. These figures will introduce the various networks and distribution methods used to provision video content to users.

FIG. 1 is a flow diagram of an exemplary computer-implemented method 100 for preprocessing application functions for faster startup. The steps shown in FIG. 1 may be performed by any suitable computer-executable code and/or computing system, including the systems illustrated in FIGS. 10-12, computing device 202 in FIG. 2, computing devices 202(1)-(3) in FIGS. 8-9, server 902 in FIG. 9, or a combination of one or more of the same. In one example, each of the steps shown in FIG. 1 may represent an algorithm whose structure includes and/or is represented by multiple sub-steps, examples of which will be provided in greater detail below. In some examples, all of the steps and sub-steps represented in FIG. 1 may be performed by one device (e.g., either a server or a client computing device). Alternatively, the steps and/or substeps represented in FIG. 1 may be performed across multiples devices (e.g., some of steps and/or sub-steps may be performed by a server and other steps and/or sub-steps may be performed by a client computing device).

Figure 2:
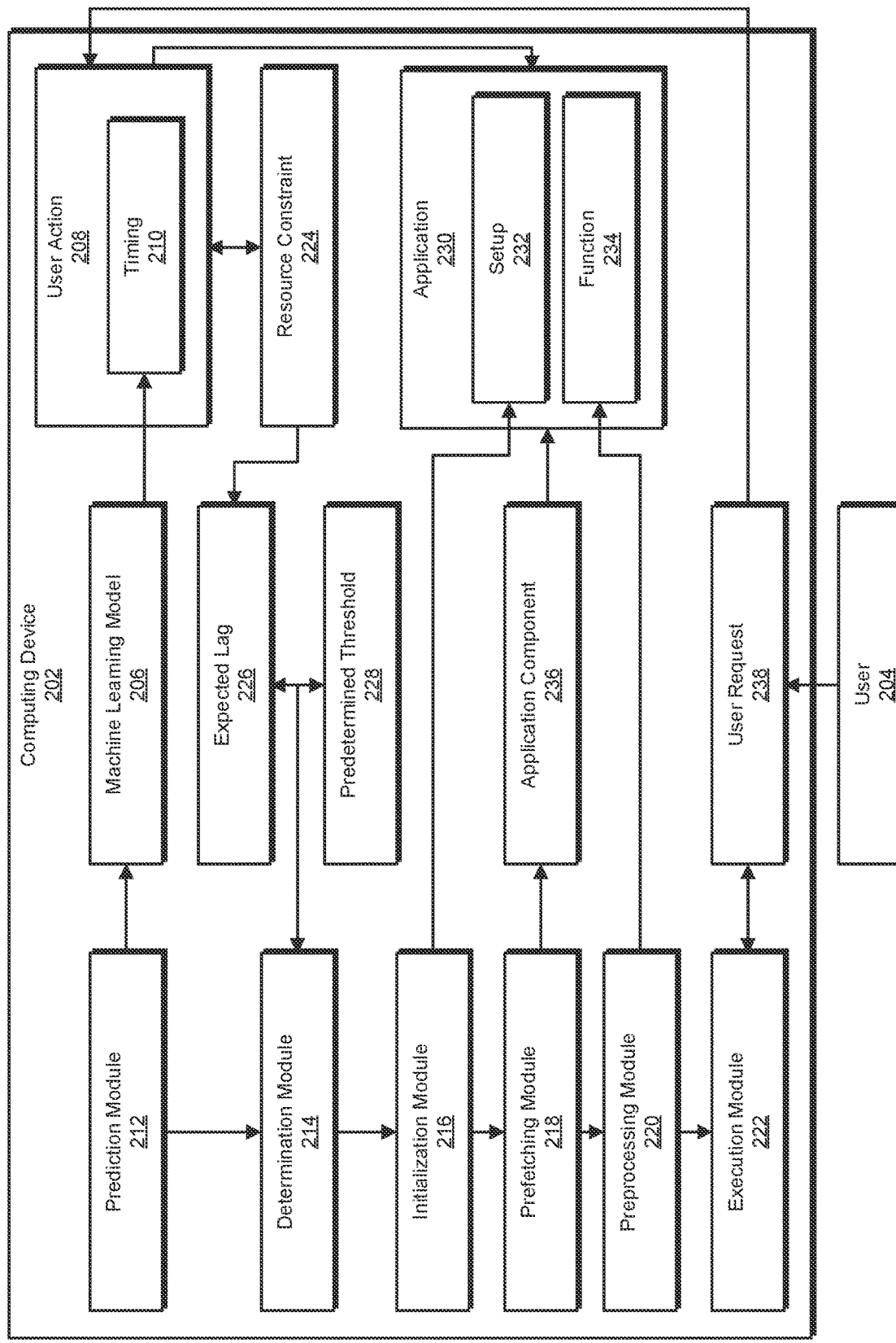
FIG. 2 is a block diagram of an exemplary computing device for preprocessing application functions for faster startup.

As illustrated in FIG. 1, at step 110, one or more of the systems described herein may predict, by a machine learning model, a user action and a timing of the user action for an application on a client computing device. For example, FIG. 2 is a block diagram of an exemplary system for preprocessing application functions for faster startup. As illustrated in FIG. 2, a prediction module 212 may, as part of computing device 202, predict, by a machine learning model 206, a user action 208 and a timing 210 of user action 208 for an application 230 on computing device 202.

In some embodiments, computing device 202 may generally represent any type or form of computing device capable of running computing software and applications. Examples of computing device 202 may include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, or any other suitable computing device.

As used herein, the term "application" generally refers to a software program designed to perform specific functions or tasks and capable of being installed, deployed, executed, and/or otherwise implemented on a computing system. Examples of applications may include, without limitation, playback application 1210 of FIG. 12, productivity software, enterprise software, entertainment software, security applications, cloud-based applications, web applications, mobile applications, content access software, simulation software, integrated software, application packages, application suites, variations or combinations of one or more of the same, and/or any other suitable software application.

The term "machine learning," as used herein, generally refers to a computational algorithm that may learn from data in order to make predictions. Examples of machine learning may include, without limitation, support vector machines, neural networks, clustering, decision trees, regression analysis, classification, variations or combinations of one or more of the same, and/or any other suitable supervised, semi-supervised, or unsupervised methods. The term "machine learning model," as used herein, generally refers to a model built using machine learning methods.

The systems described herein may perform step 110 in a variety of ways. In some embodiments, prediction module 212 may predict a likelihood of a user request 238 to execute user action 208 and timing 210 of when predicted user action 208 may be performed. In one example, prediction module 212 may predict timing 210 of user action 208 by training machine learning model 206 using a historical record of user actions on computing device 202. In this example, prediction module 212 may first predict the likelihood of user request 238 to execute user action 208 based on the historical record and then may predict expected timing 210 of the user executing user action 208. Furthermore, in this example, the historical record may include data about a historical use of application 230 on computing device 202, historical use of a different application on computing device 202, a state of computing device 202, a state of a resource of computing device 202, and/or a timing of a previous user action on computing device 202. Additionally, machine learning model 206 may represent a general model predicting the behavior of users or a more specific model based on current conditions. For example, machine learning model 206 may represent a model predicting the behavior of a specific user of computing device 202, a model trained to predict the timing of a specific action, such as user action 208, by the user, and/or a model trained to predict the timing of actions based on the current status of resources of computing device 202. In another example, machine learning model 206 may be trained to predict a series of actions (i.e., a decision vector), such as actions involved in warming a video player for application 230 in anticipation of the user playing a video, to perform on computing device 202 based on the timing and likelihood of user actions.

Multiple different machine learning models may be implemented and selected in a variety of ways. For example, machine learning model 206 may be selected from a set of machine learning models based on context (e.g., time of day, current resource usage or status on computing device 202, etc.). Additionally or alternatively, machine learning model 206 may be user-selected. For example, an option to select a type of model may be presented to a user after determining that the user begins using application 230. Once machine learning model 206 is selected, application 230 may apply the selected model in any suitable manner (e.g. by implementing an inference or scoring application programming interface).

Alternatively, machine learning model 206 may represent a predictive model for a specific action or a specific type or set of user actions. Each of these models may take into consideration instantaneous information (e.g., current device resource usage) and/or historical usage for device-profile pairs (i.e., historical information associated with a particular user and a particular device). In some examples, different models may be trained for different user actions to separately predict the likelihood of each action. For example, machine learning model 206 may represent a model that predicts when the user will stop browsing videos and selects a title to play, a model that predicts when the user actually watches videos and how long the user will continue to play videos, or a model that predicts when computing device 202 is likely to go into a resource-constrained mode.

Figure 9:
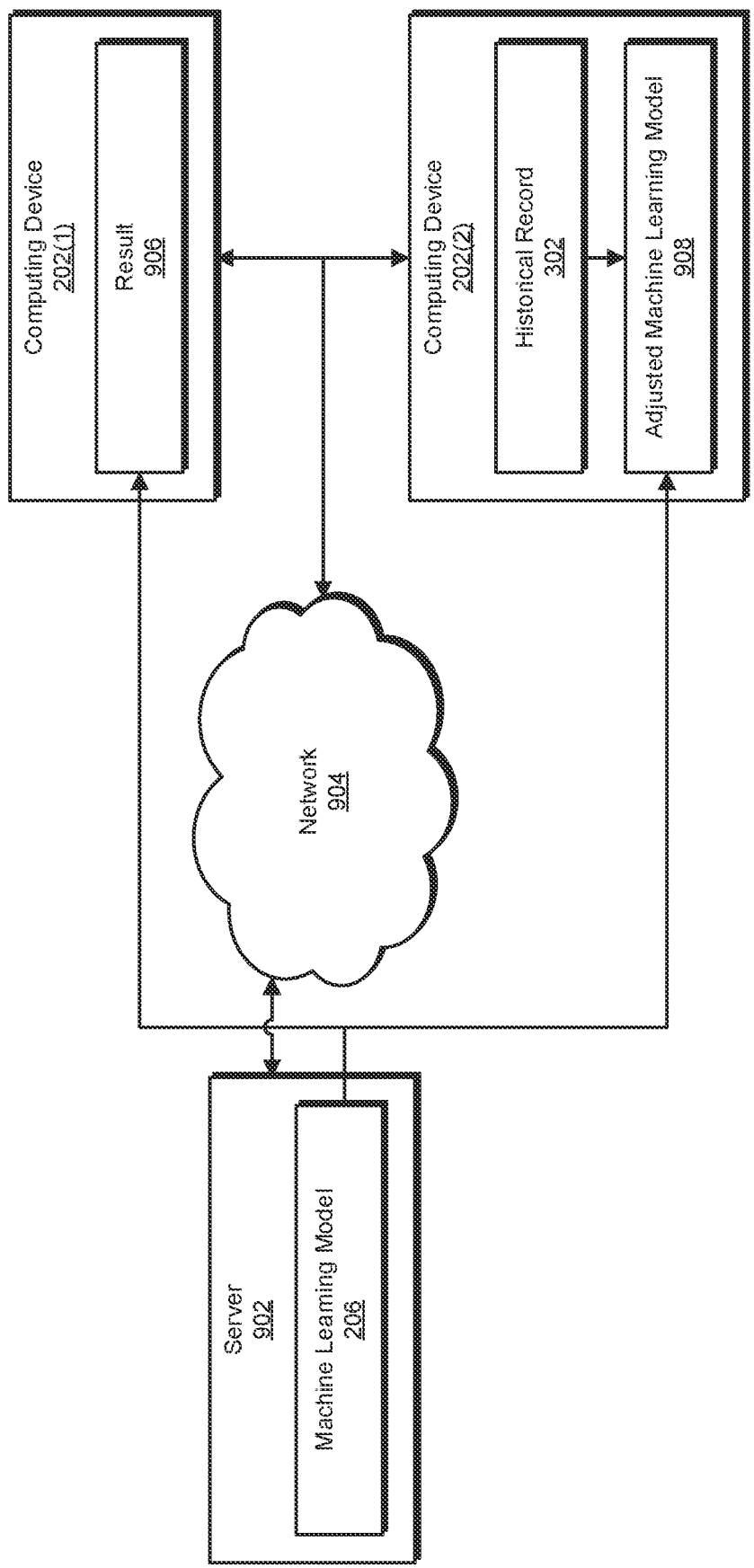
FIG. 9 is a block diagram of an exemplary adjustment to an exemplary machine learning model for a specific computing device.

Although illustrated as part of computing device 202 in FIG. 2, some or all of the modules described herein may alternatively be executed by a server, such as server 902 in FIG. 9, or any other suitable computing device. For example, prediction module 212 may train machine learning model 206 on computing device 202 to predict user action 208 and timing 210. Alternatively, prediction module 212 may train machine learning model 206 on server 902, predict user action 208 and timing 210, and send the predictions to computing device 202. As another example, prediction module 212 may train machine learning model 206 and send machine learning model 206 to computing device 202. In this example, computing device 202 may then predict user action 208 and timing 210 using trained machine learning model 206 and/or adjust machine learning model 206 based on historical records specific to computing device 202 for better predictions.

Figure 3:
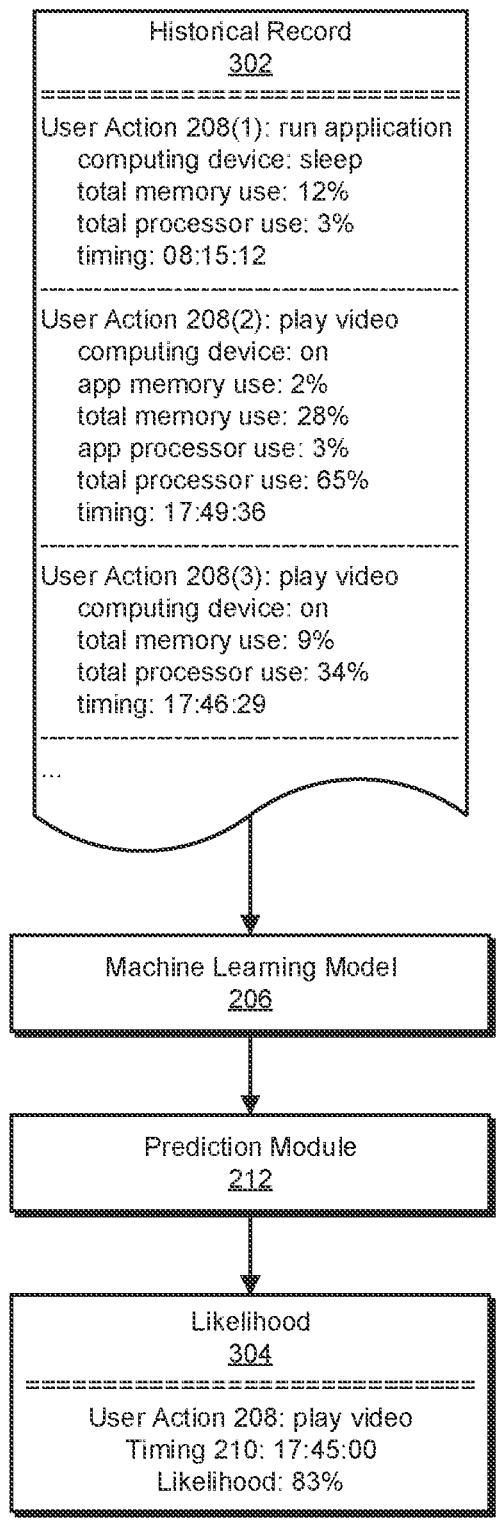
FIG. 3 is a block diagram of an exemplary machine learning model trained using exemplary historical data to predict an exemplary user action.

As illustrated in FIG. 3, a historical record 302 may include details of multiple user actions on computing device 202, such as user actions 208(1)-(3). In this example, historical record 302 may include the state of computing device 202 (i.e., "sleep" or "on") when a user performs an action, the state of resources (e.g., memory or processor usage), and the timing of each user action that indicates when the action was performed. By training machine learning model 206 using historical record 302, prediction module 212 may then predict a likelihood 304 (i.e., 83%) that a user 204 of FIG. 2 may request user action 208 (i.e., "play video") at timing 210 (i.e., "17:45:00"). Additionally, prediction module 212 may predict how long user 204 will continue to play the video and/or the amount of time before another user action is performed. In some examples, prediction module 212 may determine timing 210 to be the most likely time at which user 204 may next request user action 208. For example, prediction module 212 may determine user 204 typically requests user action 208 during a window of time on certain days, such as playing a video after work hours on weekdays. In these examples, prediction module 212 may then determine likelihood 304 based on the next expected window of time for user action 208. As another example, prediction module 212 may determine user 204 historically requests user action 208 after performing a series of other actions and determine likelihood 304 based on detecting that user 204 has recently performed the expected series of other actions. In other words, prediction module 212 may perform pattern analyses to predict user behaviors and the timing of those behaviors.

In some embodiments, prediction module 212 may predict user action 208 and timing 210 by training machine learning model 206 using a historical record of user actions on a set of client computing devices, including computing device 202, and predicting a likelihood of user request 238 to execute user action 208 based on the historical record from the set of client computing devices. In these embodiments, the historical record may include data about historical use of computing device 202 by user 204, historical use of another client computing device by user 204 and/or another user, historical use of application 230 by the other user, a state of computing device 202, a state of the other client computing device, a state of a resource of computing device 202, a state of a resource of the other client computing device, and/or a timing of a previous user action.

In some examples, prediction module 212 may train machine learning model 206 by training machine learning model 206 on a server, rather than on computing device 202.

For example, prediction module 212 may utilize data collected about recent user behaviors (i.e., data collected in the field) to predict user actions in the immediate future. In these examples, prediction module 212 may provide a result of machine learning model 206 to computing device 202. In these examples, prediction module 212 may provide the result as a prediction of what specific action user action 208 will be and a prediction of timing 210 for user action 208.

Figure 8:
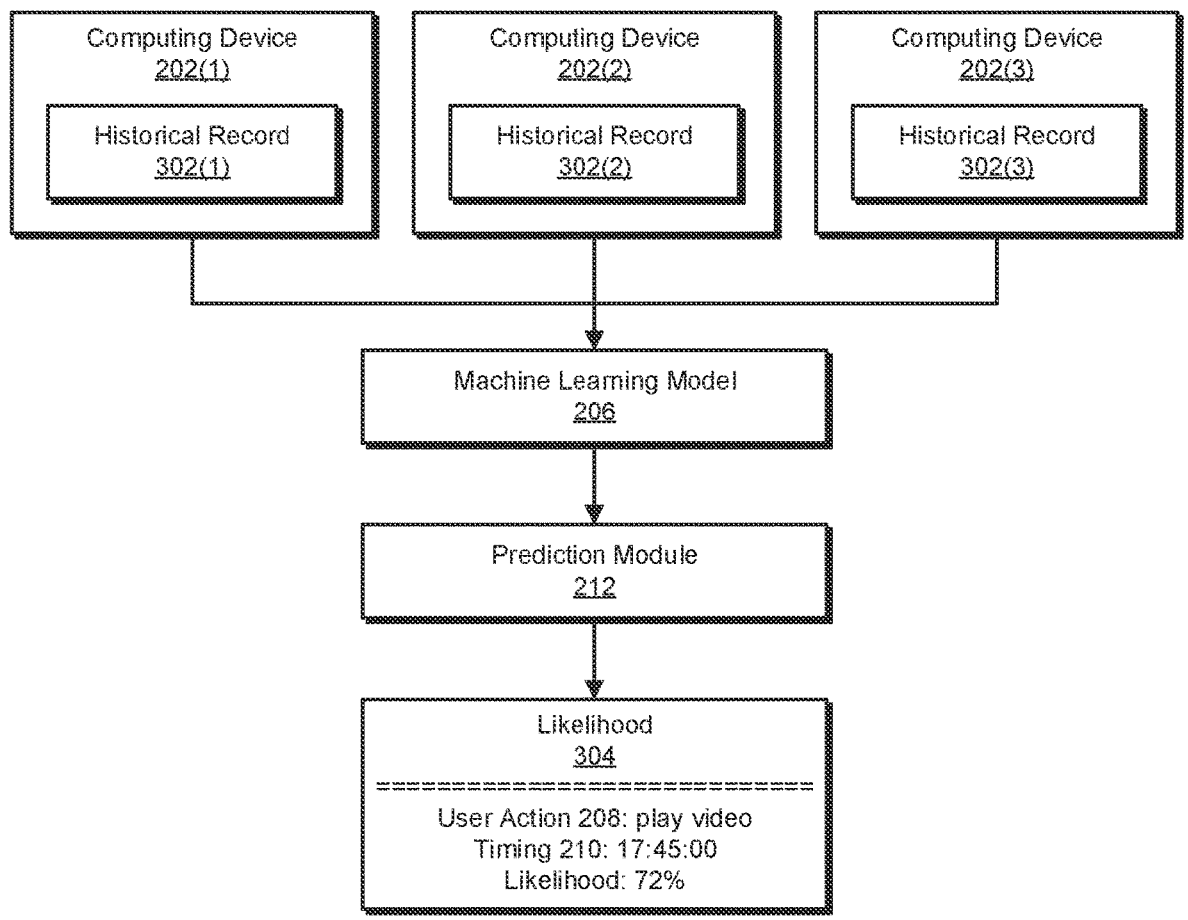
FIG. 8 is a block diagram of an exemplary machine learning model trained using exemplary historical records from multiple computing devices to predict an exemplary user action.

As illustrated in FIG. 8, computing devices 202(1)-(3) may include individual historical records 302(1)-(3), respectively. In this example, prediction module 212 may train machine learning model 206 using a combination of historical records 302(1)-(3) to determine likelihood 304 of user 204 requesting user action 208 at timing 210. In this example, prediction module 212 may predict broader trends of the usage of application 230, which may result in a different calculation of likelihood 304 (i.e., 72%) in comparison to machine learning model 206 when trained on only one historical record. In some embodiments, prediction module 212 may train machine learning model 206 on a server and adjust machine learning model 206 using new data, such as by collecting recent user actions performed on computing device 202(1) to predict future user action 208 on computing device 202(1).

In other examples, prediction module 212 may train machine learning model 206 by training machine learning model 206 on a server, providing trained machine learning model 206 to a client computing device, and adjusting machine learning model 206 based on a historical record of the client computing device. For example, prediction module 212 may train machine learning model 206 using data previously collected from client computing devices, and a specific client computing device may further adjust the trained model with more recently collected data, such as data within a time limit or data not collected by the server, and/or data more relevant to the specific client computing device and/or specific user.

As illustrated in FIG. 9, server 902 may train machine learning model 206 and provide trained machine learning model 206 to computing devices 202(1) and 202(2). In this example, computing device 202(1) may directly use a result 906 of machine learning model 206 to predict user behavior. For example, server 902 may predict user action 208 and timing 210 and send the predictions to computing device 202(1). Additionally or alternatively, server 902 may send a decision vector, as a series of actions to perform, to a computing device based on the predicted timing and likelihood of user actions. For example, server 902 may send pre-warming application logic to prepare for user action 208 to computing device 202(1), such as by sending setup 232 to initialize, application component 236 to prefetch, function 234 to preprocess, and/or the timing to perform any of the above.

Additionally, computing device 202(2) may use historical record 302, which may be unique to computing device 202(2), to train an adjusted machine learning model 908 based on machine learning model 206. In this example, computing device 202(1) may represent a low-end client device with limited processing capability that may not be equipped to train machine learning model 206, and computing device 202(2) may represent a mid-tier client device with some processing capability to modify machine learning model 206 for some personalization for computing device 202(2). In contrast, computing device 202 of FIG. 2 may represent a high-end device capable of fully customizing machine learning model 206 for user behavior for application 230 on computing device 202, which may provide more accurate predictions specific to user 204. In alternate examples, server 902 may train adjusted machine learning model 908 by collecting historical record 302 from computing device 202(2) and, subsequently, provide a result indicating predicted user action 208 and timing 210 to computing device 202(2).

In the above embodiments, computing devices 202(1)-(2) may be directly in communication with server 902 and/or in communication via a network 904. In some examples, the term "network" may refer to any medium or architecture capable of facilitating communication or data transfer. Examples of networks include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), network 1130 of FIG. 11, or any other suitable network. For example, the network may facilitate data transfer between computing devices 202(1)-(2) and server 902 using wireless or wired connections.

Server 902 may generally represent any type or form of computing device that is capable of storing and/or managing data, such as training and/or storing machine learning model 206. Examples of server 902 include, without limitation, application servers and database servers configured to provide various database services and/or run certain software applications. Additionally, computing devices 202(1)-(2) and/or server 902 may include content player 1020 in FIGS. 10 and 12 and/or various other components of FIGS. 10-11.

Returning to FIG. 1, at step 120, one or more of the systems described herein may determine that an expected lag in executing the user action is greater than a predetermined threshold based on one or more resource constraints of the client computing device. For example, a determination module 214 may, as part of computing device 202 in FIG. 2, determine that an expected lag 226 in executing user action 208 is greater than a predetermined threshold 228 based on a resource constraint 224 of computing device 202.

The systems described herein may perform step 120 in a variety of ways. In some embodiments, resource constraint 224 may include a limited resource of computing device 202 used by a core function to run application 230 and/or a function 234 of application 230 used to execute user action 208. For example, a core function may include startup functions to open application 230 and provide a graphical user interface, and function 234 may include functions to download and decode a video prior to playback.

In some examples, the limited resource may include a processor of computing device 202, a memory of computing device 202, and/or an application resource stored on computing device 202. For example, the limited resource may include a video decoder used by application 230 and stored on computing device 202. In another example, the limited resource may include images, media, and/or other assets used by application 230, such as assets used to initialize the graphical user interface.

In one embodiment, determination module 214 may determine that expected lag 226 is greater than predetermined threshold 228 by calculating that a time to perform the core function using the limited resource exceeds predetermined threshold 228 and/or calculating that a time to perform function 234 used to execute user action 208 using the limited resource exceeds predetermined threshold 228. In these embodiments, predetermined threshold 228 may represent an acceptable lag between user request 238 and execution of user action 208. In some examples, the acceptable lag may be determined to be close to zero to provide near-instantaneous execution of user action 208. In another embodiment, determination module 214 may determine that expected lag 226 is greater than predetermined threshold 228 by determining that the core function contributes to expected lag 226, determining that function 234 contributes to expected lag 226, and calculating that a combined time to perform the core function and function 234 exceeds predetermined threshold 228.

Figure 4:
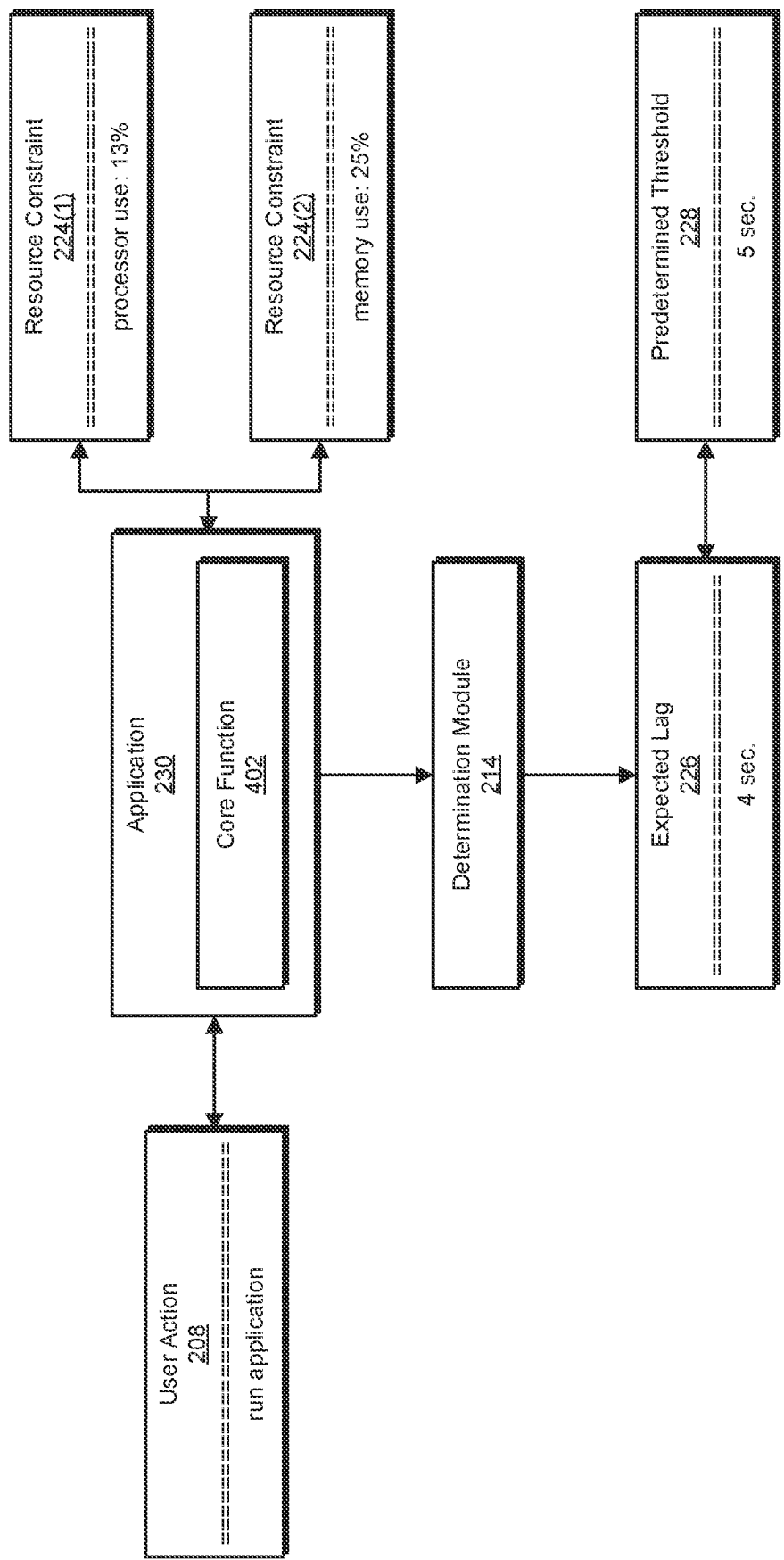
FIG. 4 is a block diagram of an exemplary calculation of expected lag for an exemplary user action.

As illustrated in FIG. 4, user action 208 may include running application 230, which may require a core function 402, such as an application startup function. In this example, determination module 214 may determine core function 402 requires use of a processor and a memory of computing device 202, which may have resource constraints 224(1) and 224(2), respectively. In this example, determination module 214 may then calculate expected lag 226 to be 4 seconds, based on existing and/or required usage of resource constraints 224(1)-(2). In some examples, predetermined threshold 228 may be calculated based on determining an amount of time user 204 is willing to wait for the execution of user action 208. In the example of FIG. 4, user 204 may be willing to wait 5 seconds before closing application 230. Thus, determination module 214 may determine expected lag 226 is less than predetermined threshold 228 in this example, and therefore core function 402 may not require warming prior to user request 238.

Figure 5:
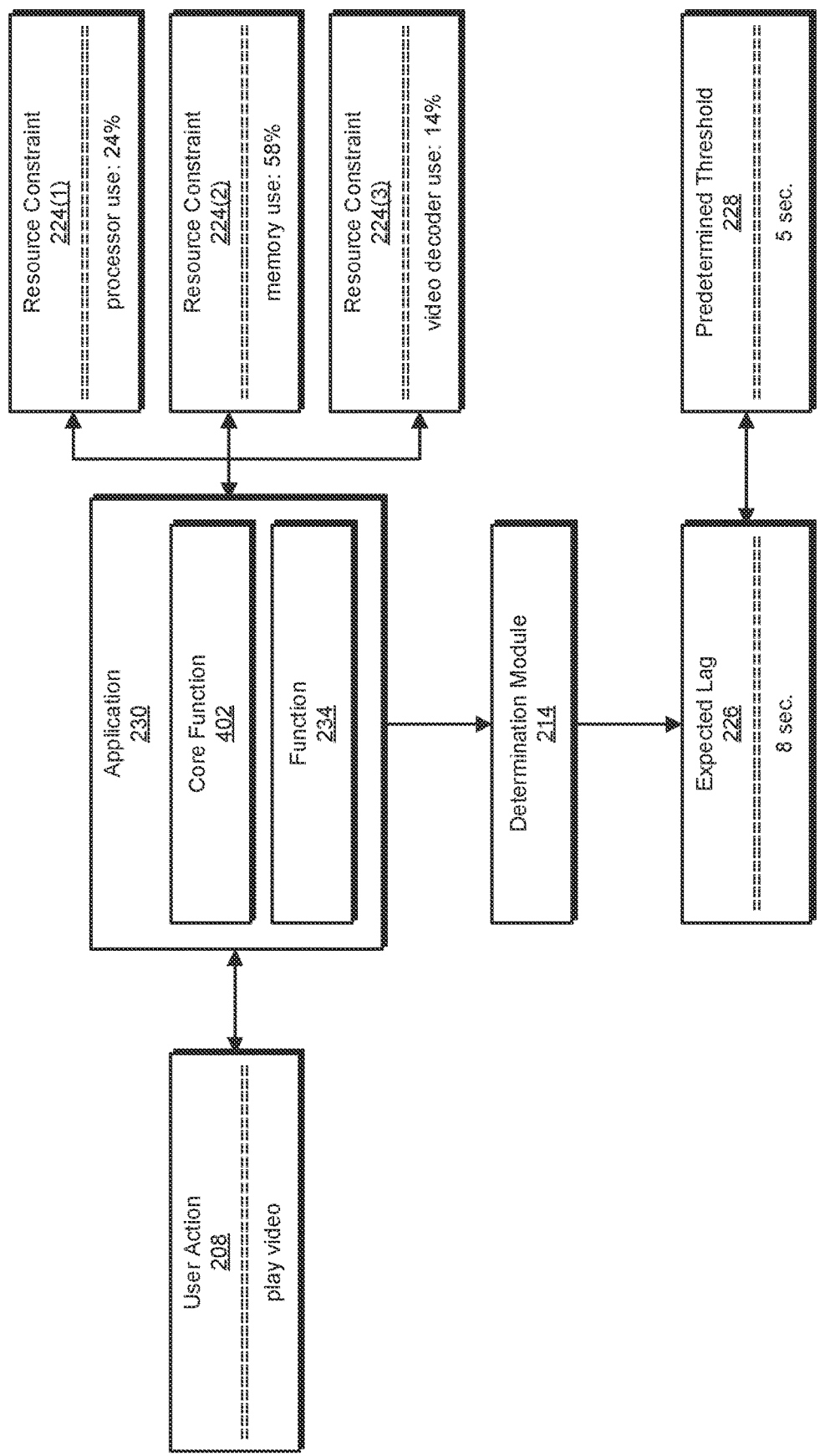
FIG. 5 is a block diagram of an additional exemplary calculation of expected lag for a different exemplary user action.

As illustrated in FIG. 5, user action 208 may include playing a video using application 230, which may require function 234 to decode the video in addition to core function 402 to start application 230. In this example, determination module 214 may determine core function 402 requires use of a processor and a memory of computing device 202 and function 234 requires a video decoder, which may have an additional resource constraint 224(3). In this example, determination module 214 may then calculate expected lag 226 to be 8 seconds, which exceeds predetermined threshold 228 of 5 seconds. Thus, determination module 214 may determine user action 208 to play a video requires application warming.

In alternate embodiments, server 902 of FIG. 9 may include determination module 214 to determine that expected lag 226 is greater than predetermined threshold 228. In these embodiments, server 902 may then determine a timing to initialize a setup of application 230 and/or perform other pre-warming functions to decrease expected lag 226 to not exceed predetermined threshold 228. In these embodiments, server 902 may provide the timing for these pre-warming functions to computing device 202.

Returning to FIG. 1, at step 130, one or more of the systems described herein may initialize a setup of the application to reduce the expected lag in executing the user action based on the predicted timing. For example, an initialization module 216 may, as part of computing device 202 in FIG. 2, initialize a setup 232 of application 230 to reduce expected lag 226 based on predicted timing 210.

The systems described herein may perform step 130 in a variety of ways. In some embodiments, initialization module 216 may initialize setup 232 of application 230 by initializing the core function, initializing function 234 used to execute user action 208 and/or initializing the limited resource used by function 234. In other embodiments, initialization module 216 may initialize setup 232 to reduce expected lag 226 by timing the initialization to begin prior to predicted timing 210 of user action 208 such that the reduced expected lag does not exceed predetermined threshold 228.

Figure 6:
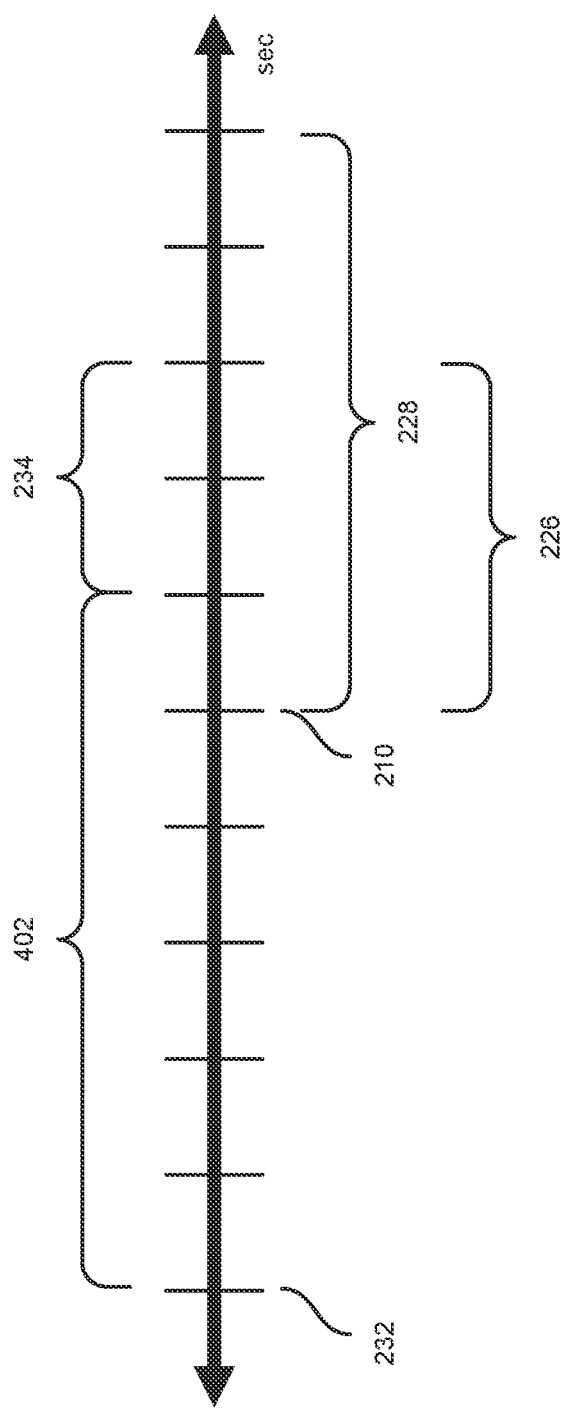
FIG. 6 is an illustration of an exemplary timeline for preprocessing functions related to an exemplary user action.

As illustrated in FIG. 6, predetermined threshold 228 may extend 5 seconds from predicted timing 210. In this example, the combined length of time to perform core function 402 (i.e., 6 seconds) and to perform function 234 (i.e., 2 seconds) may exceed predetermined threshold 228. Thus, initialization module 216 may initialize setup 232 of application 230 prior to predicted timing 210. In this example, initialization module 216 may initialize setup 232 such that core function 402 and function 234 may complete prior to the end of predetermined threshold 228. By initializing setup 232 early, initialization module 216 may ensure a reduced expected lag 226 of 3 seconds, which does not exceed predetermined threshold 228.

In the example of FIG. 6, computing device 202 may have limited resources that require sequentially initializing core function 402 and function 234. In alternate examples, initialization module 216 may simultaneously initialize multiple functions, depending on available resources. For example, initialization module 216 may initialize function 234 before core function 402 has completed, thereby further reducing expected lag 226.

Returning to FIG. 1, at step 140, one or more of the systems described herein may prefetch one or more application components in response to initializing the setup of the application. For example, a prefetching module 218 may, as part of computing device 202 in FIG. 2, prefetch an application component 236 in response to initializing setup 232 of application 230.

The systems described herein may perform step 140 in a variety of ways. As used herein, the term "prefetching" generally refers to a process of transferring and/or loading data prior to usage in preparation for later use. In some embodiments, application component 236 may include metadata, an application asset, and/or a media resource. The term "metadata," as used herein, generally refers to data that describes or provides additional information about other data, files, or the structure of files. The term "application asset," as used herein, generally refers to data or other components that support the function of an application.

Figure 7:
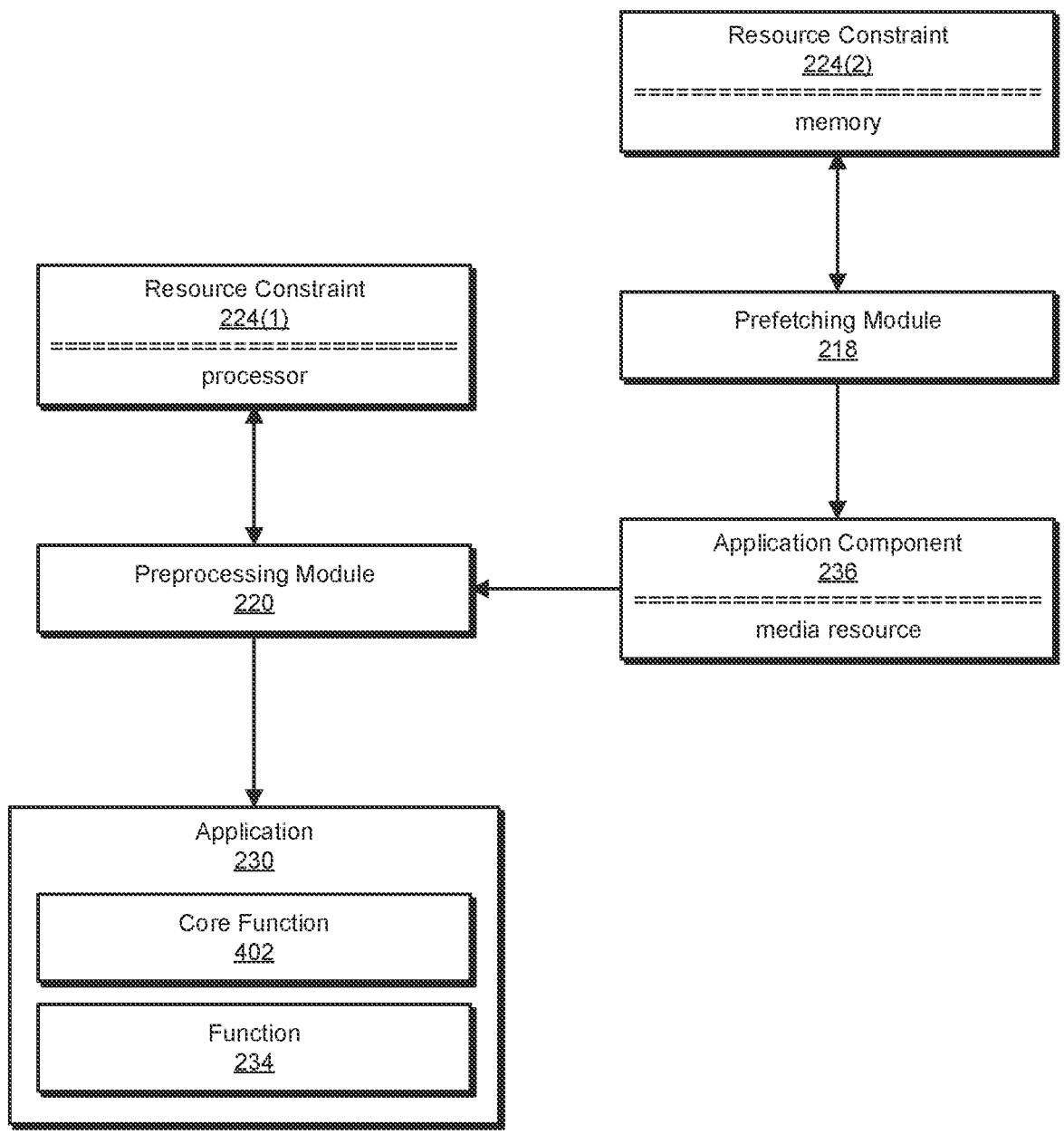
FIG. 7 is a block diagram of exemplary prefetching and preprocessing for an exemplary user action.

As illustrated in FIG. 7, prefetching module 218 may prefetch application component 236, which may include a media resource, from memory, which may include resource constraint 224(2) of FIG. 5. In this example, user action 208 to play a video may require prefetching the video as the media resource. By determining function 234 and/or core function 402 to execute user action 208 use resource constraint 224(2), prefetching module 218 may identify and prefetch the required data from memory prior to executing user action 208. Additionally, application component 236 may include data to render graphical user interface elements of application 230, such as a video playback window.

In some embodiments, prefetching module 218 may only prefetch a limited amount of data required to start application 230, depending on resource constraint 224 of FIG. 2. For example, prediction module 212 may determine user 204 is likely to perform user action 208 to scroll through a screen, when application 230 is running, and predict how far user 204 may scroll. In this example, prefetching module 218 may only prefetch graphics that user 204 may be likely to view based on the prediction. For example, prediction module 212 may predict user 204 will scroll down to browse videos to watch and predict when a video will be selected, and prefetching module 218 may prefetch graphics to display as well as prefetching resources required to play the video. In another example, prefetching module 218 may prefetch files used to initialize a skeleton graphical user interface without full functionality, and additional files may be fetched when user request 238 initializes user action 208.

Although the examples disclosed herein focus on data stored on computing device 202 rather than on resources requiring a network connection, some embodiments may include data requested from a network connection prior to executing user action 208. For example, determination module 214 may determine user action 208 requires a network connection to stream a video, and prefetching module 218 may download the video prior to user request 238 for video playback.

Returning to FIG. 1, at step 150, one or more of the systems described herein may preprocess at least a portion of a function of the application used to execute the user action. For example, a preprocessing module 220 may, as part of computing device 202 in FIG. 2, preprocess at least a portion of function 234.

The systems described herein may perform step 150 in a variety of ways. In some examples, preprocessing module 220 may preprocess function 234 by preprocessing the metadata, loading the application asset, pre-rendering an application graphic, pre-decrypting and pre-decoding the media resource, scheduling function 234, and/or initializing an application startup. For example, preprocessing module 220 may schedule a video decoding process to initialize prior to user request 238. In these examples, pre-decoding the media resource may include preparing the media resource for playback in response to user request 238.

In the example of FIG. 7, preprocessing module 220 may preprocess core function 402 and function 234 based on resource constraint 224(1) to initialize application 230 and/or pre-decode the media resource required for video playback. In this example, preprocessing module 220 may pre-load and/or pre-execute application component 236 prefetched by prefetching module 218. In other examples, prefetching module 218 may prefetch application libraries, data rights management (DRM) decryption modules, and/or other data. In these examples, preprocessing module 220 may then load the application libraries, DRM decryption modules, and/or other data to prepare for decoding the video. In additional examples, preprocessing module 220 may run an initialization sequence that loads and/or executes using specific hardware modules to prepare for decrypting and/or decoding the video.

In the example of video playback, preprocessing module 220 may initialize a playback pipeline to set up a video decoder, render a user interface, set up a media buffer, initialize a codec for video streaming, set up a security function, and/or initialize other functions. In one example, preprocessing module 220 may partially pre-decode and/or pre-load a beginning of a video, such as a number of frames of the video, to provide seemingly instant streaming of the video when user request 238 is received. In this example, computing device 202 may process the remainder of the video as the beginning of the video is played by user 204.

Returning to FIG. 1, at step 160, one or more of the systems described herein may execute the user action for the application in response to a user request. For example, an execution module 222 may, as part of computing device 202 in FIG. 2, execute user action 208 for application 230 in response to user request 238.

The systems described herein may perform step 160 in a variety of ways. In some embodiments, execution module 222 may execute user action 208 by receiving user request 238, completing setup 232 of application 230, and completing function 234 used to execute user action 208. In the example of FIG. 2, user 204 may send user request 238 to computing device 202, and execution module 222 may determine that user request 238 requests the execution of user action 208. Subsequently, execution module 222 may perform user action 208 by completing setup 232 and function 234 that has been initialized by initialization module 216. In the above example of playing a video, user request 238 may include user 204 selecting a play button in application 230, and execution module 222 may begin playing the video requested by user 204 while completing the decoding of the remainder of the video.

In some examples, the above described systems may further include running application logic to reduce a likelihood of forcible termination of application 230. In these examples, the above described systems may decrease a resource usage of application 230 and/or initialize setup 232 of application 230 closer to predicted timing 210. For example, an operating system of computing device 202 may attempt to terminate background processes to reduce usage of computing resources. The above described systems may predict when the operating system is likely to begin a resource-constrained mode and/or may predict when user actions are likely to trigger the reduction of computing resources. In this example, the above described systems may identify the computing resources under heavy usage and adjust function 234 to decrease the use of the identified computing resources. In this example, function 234 may resume regular usage of the computing resources when the operating system is no longer terminating background processes. Additionally or alternatively, the above described systems may mitigate the likelihood of application 230 being terminated for inactivity by reducing the potential for idle time (e.g., by decreasing the time between initializing setup 232 of application 230 and predicted timing 210). Decreasing the time between initializing setup 232 of application 230 and predicted timing 210 may also speed up restart time, which would mitigate the impact of application 230 being terminated for inactivity. For example, in the example of FIG. 6, setup 232 may begin two seconds later to reduce the likelihood of forcible termination between initialization and timing 210. In additional examples, faster initialization and accurately predicted timing 210 may also ensure that user action 208 executes faster after a recent forcible termination of application 230 to provide a near-instant user experience. For example, given a high likelihood of forcible termination, initialization module 216 may time the initialization of setup 232 closer to when machine learning model 206 predicts the user is going to use application 230 to provide faster loading after a forcible termination.

As explained above in connection with method 100 in FIG. 1, the disclosed systems and methods may, by training a machine learning model to predict user behavior in using an application, preprocess necessary functions to reduce latency in performing user actions in the application. Specifically, the disclosed systems and methods may first train the machine learning model to recognize patterns in historical data on user behavior to predict when a user may perform an action. The disclosed systems and methods may then calculate the time required to execute the action and initialize the action and/or a setup of the application prior to the predicted timing. For example, the systems and methods described herein may calculate an acceptable delay between a user requesting an action to be performed in the application and the actual execution of the requested action. The disclosed systems and methods may then ensure the application is initialized prior to the user request to avoid exceeding the acceptable delay.

Additionally, the systems and methods described herein may then prefetch data and/or resources used to startup the application and/or to perform the requested action. The disclosed systems and methods may then use the data and/or resources to preprocess some or all of the functions used to perform the requested user action prior to receiving the user request. Thus, the systems and methods described herein may preprocess predicted application functions to reduce the latency experienced by a user when using the application. Additionally, by predicting potential forcible termination of the application, the disclosed systems and methods may execute application functions and/or time the initialization of application functions to prevent forcible termination or to regain a warm state after forcible termination. The systems and methods described herein may also be implemented server-side to be more scalable for low-end devices, client-side to be privacy aware and available offline without requiring server communication, or using a mixture of server and client models depending on available device and/or network resources.

Content that is created or modified using the methods described herein may be used and/or distributed in a variety of ways and/or by a variety of systems. Such systems may include content distribution ecosystems, as shown in FIGS. 10-12.

Figure 10:
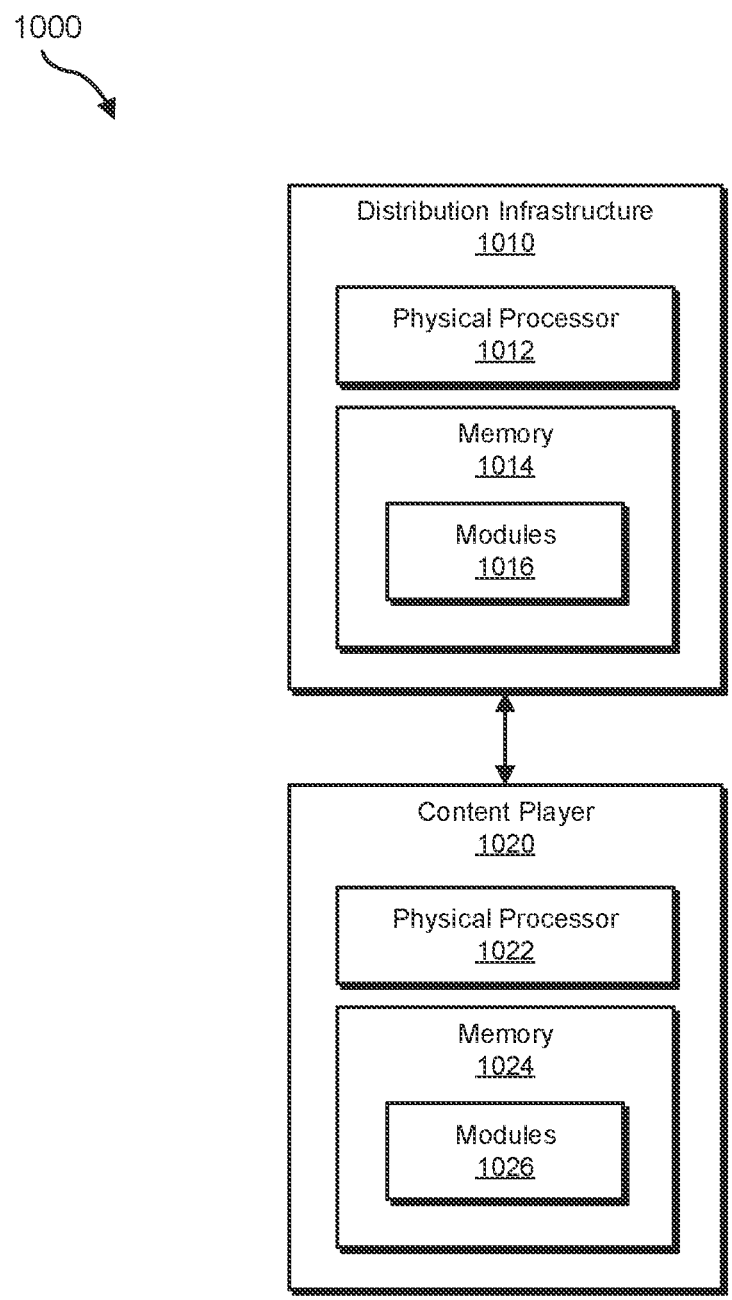
FIG. 10 is a block diagram of an exemplary content distribution ecosystem.

FIG. 10 is a block diagram of a content distribution ecosystem 1000 that includes a distribution infrastructure 1010 in communication with a content player 1020. In some embodiments, distribution infrastructure 1010 may be configured to encode data and to transfer the encoded data to content player 1020 via data packets. Content player 1020 may be configured to receive the encoded data via distribution infrastructure 1010 and to decode the data for playback to a user. The data provided by distribution infrastructure 1010 may include audio, video, text, images, animations, interactive content, haptic data, virtual or augmented reality data, location data, gaming data, or any other type of data that may be provided via streaming.

Distribution infrastructure 1010 generally represents any services, hardware, software, or other infrastructure components configured to deliver content to end users. For example, distribution infrastructure 1010 may include content aggregation systems, media transcoding and packaging services, network components (e.g., network adapters), and/or a variety of other types of hardware and software. Distribution infrastructure 1010 may be implemented as a highly complex distribution system, a single media server or device, or anything in between. In some examples, regardless of size or complexity, distribution infrastructure 1010 may include at least one physical processor 1012 and at least one memory device 1014. One or more modules 1016 may be stored or loaded into memory 1014 to enable adaptive streaming, as discussed herein.

Content player 1020 generally represents any type or form of device or system capable of playing audio and/or video content that has been provided over distribution infrastructure 1010. Examples of content player 1020 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 1010, content player 1020 may include a physical processor 1022, memory 1024, and one or more modules 1026. Some or all of the adaptive streaming processes described herein may be performed or enabled by modules 1026, and in some examples, modules 1016 of distribution infrastructure 1010 may coordinate with modules 1026 of content player 1020 to provide adaptive streaming of multimedia content.

In certain embodiments, one or more of modules 1016 and/or 1026 in FIG. 10 may represent one or more software applications or programs that, when executed by a computing device, may cause the computing device to perform one or more tasks. For example, and as will be described in greater detail below, one or more of modules 1016 and 1026 may represent modules stored and configured to run on one or more general-purpose computing devices. One or more of modules 1016 and 1026 in FIG. 10 may also represent all or portions of one or more special-purpose computers configured to perform one or more tasks.

Physical processors 1012 and 1022 generally represent any type or form of hardware-implemented processing unit capable of interpreting and/or executing computer-readable instructions. In one example, physical processors 1012 and 1022 may access and/or modify one or more of modules 1016 and 1026, respectively. Additionally or alternatively, physical processors 1012 and 1022 may execute one or more of modules 1016 and 1026 to facilitate adaptive streaming of multimedia content. Examples of physical processors 1012 and 1022 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 1014 and 1024 generally represent any type or form of volatile or non-volatile storage device or medium capable of storing data and/or computer-readable instructions. In one example, memory 1014 and/or 1024 may store, load, and/or maintain one or more of modules 1016 and 1026. Examples of memory 1014 and/or 1024 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

Figure 11:
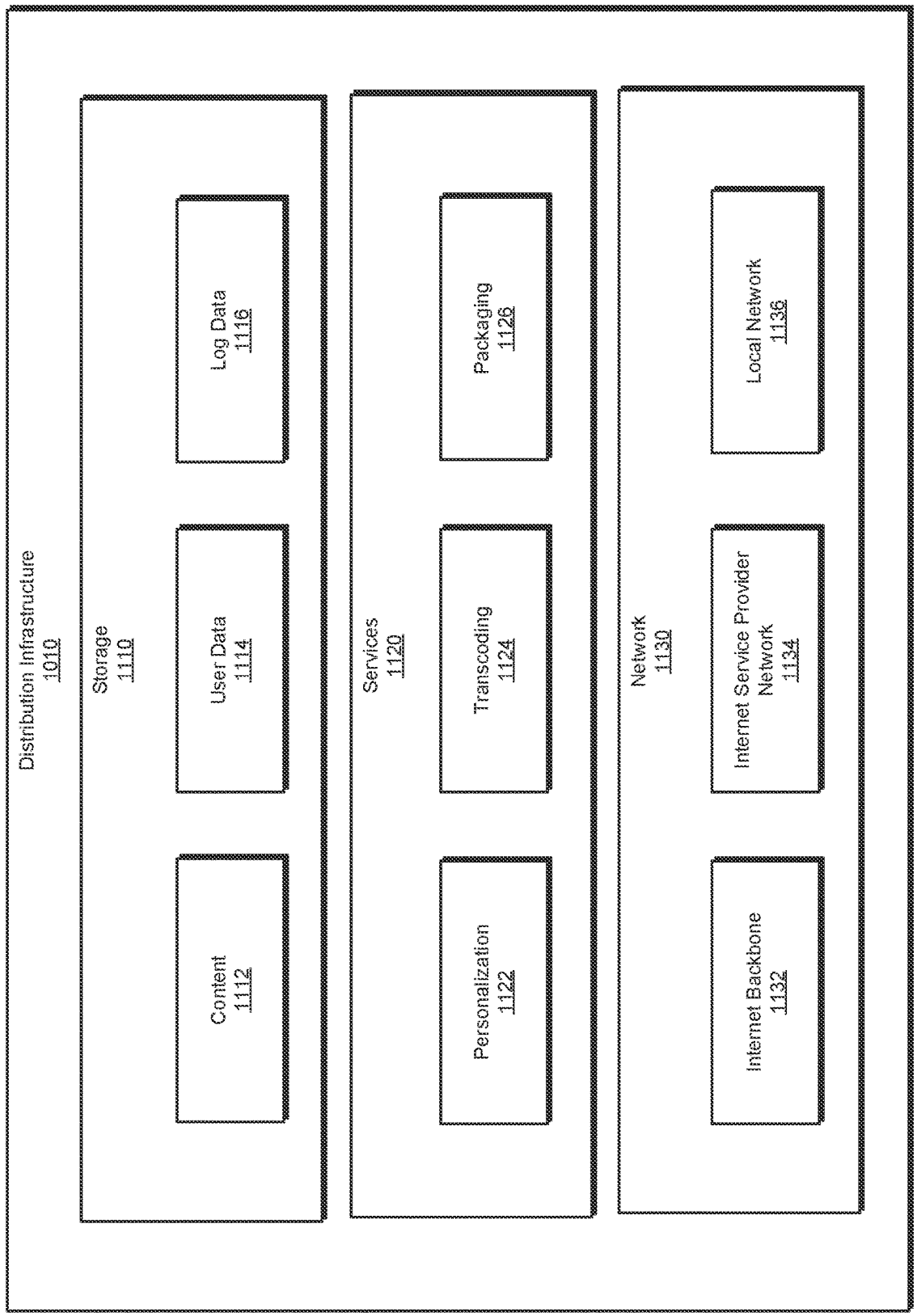
FIG. 11 is a block diagram of an exemplary distribution infrastructure within the content distribution ecosystem shown in FIG. 10.

FIG. 11 is a block diagram of exemplary components of content distribution infrastructure 1010 according to certain embodiments. Distribution infrastructure 1010 may include storage 1110, services 1120, and a network 1130. Storage 1110 generally represents any device, set of devices, and/or systems capable of storing content for delivery to end users. Storage 1110 may include a central repository with devices capable of storing terabytes or petabytes of data and/or may include distributed storage systems (e.g., appliances that mirror or cache content at Internet interconnect locations to provide faster access to the mirrored content within certain regions). Storage 1110 may also be configured in any other suitable manner.

As shown, storage 1110 may store, among other items, content 1112, user data 1114, and/or log data 1116. Content 1112 may include television shows, movies, video games, user-generated content, and/or any other suitable type or form of content. User data 1114 may include personally identifiable information (PII), payment information, preference settings, language and accessibility settings, and/or any other information associated with a particular user or content player. Log data 1116 may include viewing history information, network throughput information, and/or any other metrics associated with a user's connection to or interactions with distribution infrastructure 1010.

Services 1120 may include personalization services 1122, transcoding services 1124, and/or packaging services 1126.

Personalization services 1122 may personalize recommendations, content streams, and/or other aspects of a user's experience with distribution infrastructure 1010. Encoding services 1124 may compress media at different bitrates which may enable real-time switching between different encodings. Packaging services 1126 may package encoded video before deploying it to a delivery network, such as network 1130, for streaming.

Network 1130 generally represents any medium or architecture capable of facilitating communication or data transfer. Network 1130 may facilitate communication or data transfer via transport protocols using wireless and/or wired connections. Examples of network 1130 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 11, network 1130 may include an Internet backbone 1132, an internet service provider 1134, and/or a local network 1136.

Figure 12:
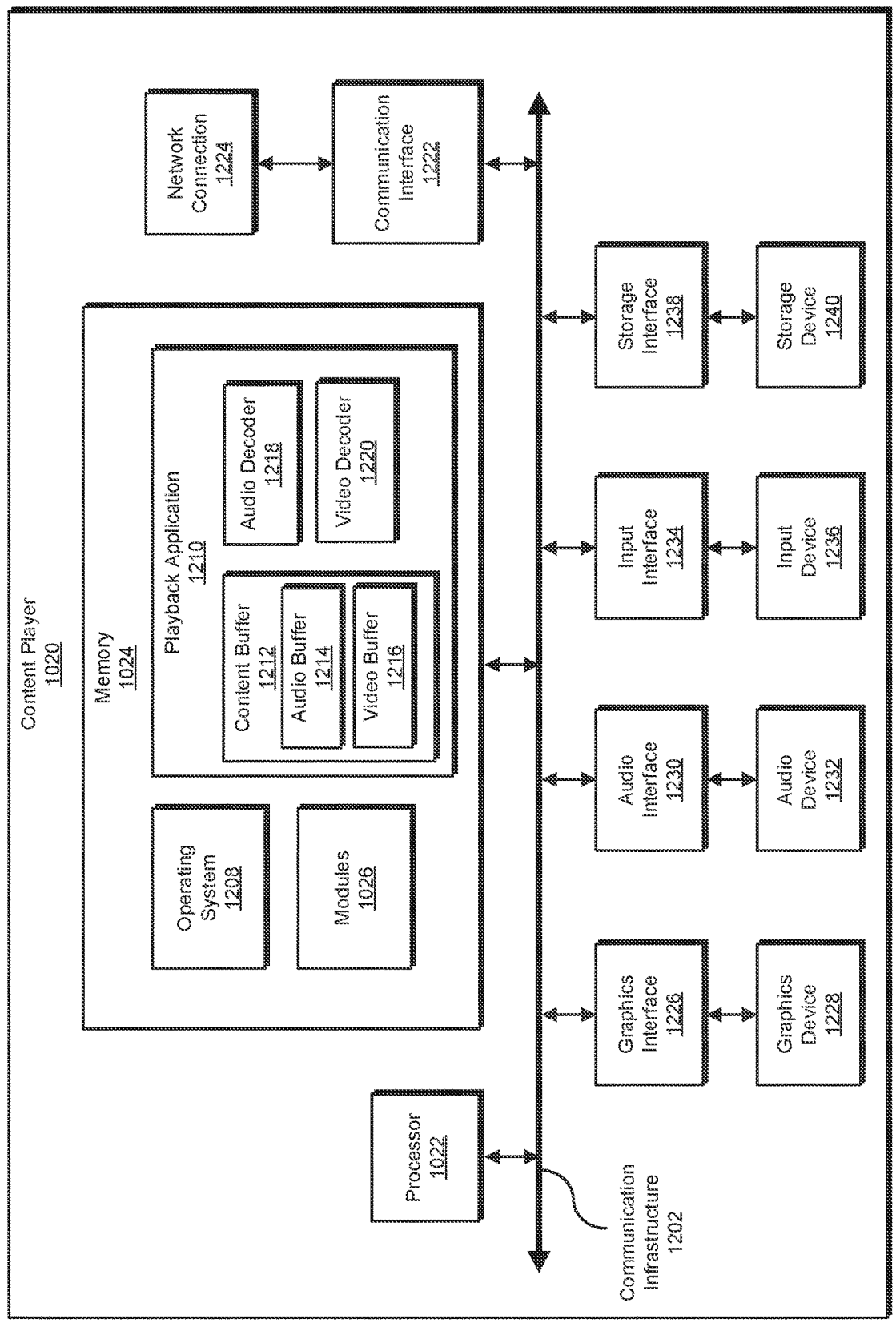
FIG. 12 is a block diagram of an exemplary content player within the content distribution ecosystem shown in FIG. 10.

FIG. 12 is a block diagram of an exemplary implementation of content player 1020 of FIG. 10. Content player 1020 generally represents any type or form of computing device capable of reading computer-executable instructions. Content player 1020 may include, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 12, in addition to processor 1022 and memory 1024, content player 1020 may include a communication infrastructure 1202 and a communication interface 1222 coupled to a network connection 1224. Content player 1020 may also include a graphics interface 1226 coupled to a graphics device 1228, an audio interface 1230 coupled to an audio device 1232, an input interface 1234 coupled to an input device 1236, and a storage interface 1238 coupled to a storage device 1240.

Communication infrastructure 1202 generally represents any type or form of infrastructure capable of facilitating communication between one or more components of a computing device. Examples of communication infrastructure 1202 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 1024 generally represents any type or form of volatile or non-volatile storage device or medium capable of storing data and/or other computer-readable instructions. In some examples, memory 1024 may store and/or load an operating system 1208 for execution by processor 1022. In one example, operating system 1208 may include and/or represent software that manages computer hardware and software resources and/or provides common services to computer programs and/or applications on content player 1020.

Operating system 1208 may perform various system management functions, such as managing hardware components (e.g., graphics interface 1226, audio interface 1230, input interface 1234, and/or storage interface 1238). Operating system 1208 may also process memory management models for playback application 1210. The modules of playback application 1210 may include, for example, a content buffer 1212, an audio decoder 1218, and a video decoder 1220.

Playback application 1210 may be configured to retrieve digital content via communication interface 1222 and play the digital content through graphics interface 1226. A video decoder 1220 may read units of video data from audio buffer 1214 and/or video buffer 1216 and may output the units of video data in a sequence of video frames corresponding in duration to the fixed span of playback time. Reading a unit of video data from video buffer 1216 may effectively dequeue the unit of video data from video buffer 1216. The sequence of video frames may then be rendered by graphics interface 1226 and transmitted to graphics device 1228 to be displayed to a user.

In situations where the bandwidth of distribution infrastructure 1010 is limited and/or variable, playback application 1210 may download and buffer consecutive portions of video data and/or audio data from video encodings with different bit rates based on a variety of factors (e.g., scene complexity, audio complexity, network bandwidth, device capabilities, etc.). In some embodiments, video playback quality may be prioritized over audio playback quality. Audio playback and video playback quality may also be balanced with each other, and in some embodiments audio playback quality may be prioritized over video playback quality.

Content player 1020 may also include a storage device 1240 coupled to communication infrastructure 1202 via a storage interface 1238. Storage device 1240 generally represent any type or form of storage device or medium capable of storing data and/or other computer-readable instructions. For example, storage device 1240 may be a magnetic disk drive, a solid-state drive, an optical disk drive, a flash drive, or the like. Storage interface 1238 generally represents any type or form of interface or device for transferring data between storage device 1240 and other components of content player 1020.

Many other devices or subsystems may be included in or connected to content player 1020. Conversely, one or more of the components and devices illustrated in FIG. 12 need not be present to practice the embodiments described and/or illustrated herein. The devices and subsystems referenced above may also be interconnected in different ways from that shown in FIG. 12. Content player 1020 may also employ any number of software, firmware, and/or hardware configurations.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a historical record of user behavior to be transformed, transform the historical record, output a result of the transformation to train a machine learning model, use the result of the transformation to predict a user action and the timing of the user action, and store the result of the transformation to preprocess functions for the user action. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   predicting, by a machine learning model, a user action and a timing of the user action for an application on a computing device;
   determining that an expected lag in executing the user action is greater than a predetermined threshold based on at least one resource constraint of the computing device;
   initializing a setup of the application, prior to application startup, to reduce the expected lag in executing the user action based on the predicted timing, wherein initializing the setup of the application comprises initializing a startup function to open the application;
   prefetching at least one application component in response to initializing the setup of the application;
   preprocessing at least a portion of a function of the application used to execute the user action; and
   executing the user action for the application in response to a user request.

2. The method of claim 1, wherein predicting the user action and the timing of the user action comprises:
   training the machine learning model using a historical record of user actions on the computing device; and
   predicting a likelihood of the user request to execute the user action based on the historical record.

3. The method of claim 2, wherein the historical record comprises data about at least one of:
   historical use of the application on the computing device;
   historical use of a different application on the computing device;
   a state of the computing device;
   a state of a resource of the computing device; or
   a timing of a previous user action on the computing device.

4. The method of claim 1, wherein the resource constraint comprises a limited resource of the computing device used by at least one of:
   a core function to run the application; or
   the function of the application used to execute the user action.

5. The method of claim 4, wherein the limited resource comprises at least one of:
   a processor of the computing device;
   a memory of the computing device; or
   an application resource stored on the computing device.

6. The method of claim 4, wherein determining that the expected lag is greater than the predetermined threshold comprises at least one of:

calculating that a time to perform the core function using the limited resource exceeds the predetermined threshold; or calculating that a time to perform the function used to execute the user action using the limited resource exceeds the predetermined threshold.

7. The method of claim 4, wherein determining that the expected lag is greater than the predetermined threshold comprises:

determining that the core function contributes to the expected lag;

determining that the function used to execute the user action contributes to the expected lag; and calculating that a combined time to perform the core function and the function used to execute the user action exceeds the predetermined threshold.

8. The method of claim 4, wherein initializing the setup of the application comprises at least one of:

initializing the core function;

initializing the function used to execute the user action; or initializing the limited resource used by the function.

9. The method of claim 1, wherein initializing the setup of the application to reduce the expected lag comprises timing the initialization to begin prior to the predicted timing of the user action such that the reduced expected lag does not exceed the predetermined threshold.

10. The method of claim 1, wherein the application component comprises at least one of:

metadata;

an application asset; or a media resource.

11. The method of claim 10, wherein preprocessing the function used to execute the user action comprises at least one of:

preprocessing the metadata;

loading the application asset;

pre-rendering an application graphic;

pre-decrypting the media resource;

pre-decoding the media resource;

scheduling the function used to execute the user action; or initializing an application startup.

12. The method of claim 11, wherein pre-decoding the media resource comprises preparing the media resource for playback in response to the user request.

13. The method of claim 1, wherein executing the user action in response to the user request comprises:

receiving the user request;

completing the setup of the application; and completing the function used to execute the user action.

14. The method of claim 1, further comprising reducing a likelihood of forcible termination of the application by at least one of:

decreasing a resource usage of the application; or initializing the setup of the application closer to the predicted timing.

15. A system comprising:

a prediction module, stored in memory, that predicts, by a machine learning model, a user action and a timing of the user action for an application on a client computing device;

a determination module, stored in memory, that determines that an expected lag in executing the user action is greater than a predetermined threshold based on at least one resource constraint of the client computing device;

an initialization module, stored in memory, that initializes a setup of the application, prior to application startup, to reduce the expected lag in executing the user action based on the predicted timing, wherein initializing the setup of the application comprises initializing a startup function to open the application;

a prefetching module, stored in memory, that prefetches at least one application component in response to initializing the setup of the application;

a preprocessing module, stored in memory, that preprocesses at least a portion of a function of the application used to execute the user action;

an execution module, stored in memory, that executes the user action for the application in response to a user request; and at least one processor that executes the prediction module, the determination module, the initialization module, the prefetching module, the preprocessing module, and the execution module.

16. The system of claim 15, wherein the prediction module predicts the user action and the timing of the user action by:

training the machine learning model using a historical record of user actions on a set of client computing devices including the client computing device; and predicting a likelihood of the user request to execute the user action.

17. The system of claim 16, wherein the historical record comprises data about at least one of:

historical use of the client computing device by a user;

historical use of another client computing device by the user;

historical use of the application by another user;

a state of the client computing device;

a state of the other client computing device;

a state of a resource of the client computing device;

a state of a resource of the other client computing device; or a timing of a previous user action.

18. The system of claim 16, wherein training the machine learning model comprises:

training the machine learning model on a server; and providing a result of the machine learning model to the client computing device.

19. The system of claim 16, wherein training the machine learning model comprises:

training the machine learning model on a server;

providing the machine learning model to the client computing device; and adjusting the machine learning model based on a historical record of the client computing device.

20. A non-transitory computer-readable medium comprising one or more computer-executable instructions that, when executed by at least one processor of a computing device, cause the computing device to:

predict, by a machine learning model, a user action and a timing of the user action for an application on the computing device;

determine that an expected lag in executing the user action is greater than a predetermined threshold based on at least one resource constraint of the computing device;

initialize a setup of the application, prior to application startup, to reduce the expected lag in executing the user action based on the predicted timing, wherein initializing the setup of the application comprises initializing a startup function to open the application;

prefetch at least one application component in response to initializing the setup of the application;

preprocess at least a portion of a function of the application used to execute the user action; and execute the user action for the application in response to a user request.

* * * * *